United States Patent
Wetmore

(10) Patent No.: US 8,893,440 B2
(45) Date of Patent: Nov. 25, 2014

(54) THROUGH-WALL MASONRY FLASHING AND DRAINAGE DEVICE

(75) Inventor: Craig Wetmore, Cumberland, ME (US)

(73) Assignee: York Manufacturing, Inc., Sanford, ME (US)

( * ) Notice: Subject to any disclaimer, the term of this patent is extended or adjusted under 35 U.S.C. 154(b) by 135 days.

(21) Appl. No.: 13/525,952

(22) Filed: Jun. 18, 2012

(65) Prior Publication Data

US 2012/0255250 A1 Oct. 11, 2012

Related U.S. Application Data

(63) Continuation-in-part of application No. 13/022,492, filed on Feb. 7, 2011, now Pat. No. 8,201,361, which is a continuation of application No. 10/710,845, filed on Aug. 6, 2004, now Pat. No. 7,900,404.

(51) Int. Cl.
| | | |
|---|---|---|
| *E04D 3/38* | (2006.01) | |
| *E04B 1/64* | (2006.01) | |
| *E04B 1/66* | (2006.01) | |
| *E04B 1/70* | (2006.01) | |
| *B32B 5/02* | (2006.01) | |
| *B32B 5/26* | (2006.01) | |
| *B32B 7/12* | (2006.01) | |
| *B32B 15/10* | (2006.01) | |
| *B32B 15/18* | (2006.01) | |
| *B32B 21/06* | (2006.01) | |

(52) U.S. Cl.
CPC ............ *E04B 1/644* (2013.01); *E04B 1/665* (2013.01); *E04B 1/7046* (2013.01); *B32B 5/024* (2013.01); *B32B 5/028* (2013.01); *B32B 5/26* (2013.01); *B32B 7/12* (2013.01); *B32B 15/10* (2013.01); *B32B 15/18* (2013.01); *B32B 21/06* (2013.01); *B32B 2262/0253* (2013.01); *B32B 2262/101* (2013.01); *B32B 2419/00* (2013.01)
USPC ................ 52/62; 52/169.5; 52/302.6; 52/379

(58) Field of Classification Search
USPC ........ 52/58, 60, 61, 62, 169.5, 169.14, 302.1, 52/302.6, 232, 513, 379; 442/239; 49/13
See application file for complete search history.

(56) References Cited

U.S. PATENT DOCUMENTS

| | | | | |
|---|---|---|---|---|
| 1,861,998 | A | * | 6/1932 | Bennett ............................. 52/96 |
| 3,483,664 | A | * | 12/1969 | Malone, Jr. et al. ......... 52/309.6 |
| 3,497,417 | A | * | 2/1970 | Rizzo ............................ 428/608 |
| 2002/0152693 | A1 | * | 10/2002 | Krogstad .......................... 52/58 |
| 2005/0260367 | A1 | | 11/2005 | Chambers et al. |

* cited by examiner

*Primary Examiner* — William Gilbert
(74) *Attorney, Agent, or Firm* — Mesmer & Deleault, PLLC

(57) ABSTRACT

A combination through-wall masonry flashing and drainage device has a flashing membrane made of stainless steel sheet and a reinforcing cloth affixed to a first side of the flashing membrane. The flashing membrane has a thickness between 0.001 and 0.007 inch. When installed between an inner wall and an outer wall, water between the inner wall and outer wall is diverted to the outside of the outer wall by the through-wall masonry flashing and drainage device.

12 Claims, 4 Drawing Sheets

THROUGH-WALL MASONRY FLASHING AND DRAINAGE DEVICE

This application is a continuation-in-part of U.S. non-provisional application Ser. No. 13/022,492, filed on Feb. 7, 2011 (to issue as U.S. Pat. No. 8,201,361 on Jun. 19, 2012), which is a continuation of U.S. application Ser. No. 10/710,845, filed Aug. 6, 2004 (now U.S. Pat. No. 7,900,404).

BACKGROUND

1. Field of the Invention

The present invention is related generally to multi-layer flashing devices for masonry construction. More specifically, the present invention is related to a through-wall masonry flashing and drainage device.

2. Description of the Related Art

A masonry cavity wall traditionally is constructed having an inner back-up wall made of concrete, masonry block, brick, wood or steel frame construction, and an outer veneer wall of brick, stone, block, stucco, or other masonry. The two walls are separated by an air space or cavity. The width of this cavity can be specified by building code or architectural design preference. The design of two walls separated by a cavity serves both the purpose of preventing water from reaching the interior of the building and the purpose of increasing the wall's insulation value. As water penetrates the outer wall or "wythe", it collects and condenses on the inner face of the outer wall. It runs down this surface to a point where its downward flow is interrupted by a horizontal plane such as a window, door, shelf angle, lintel, or the base of the wall itself. At these points, the water is diverted out of the wall by the through-wall flashing and weep devices which are placed in such a manner as to maximize the evacuation of the water. Weep devices can be metal or plastic tubes, ropes, and other devices.

Ideally, the flashing is affixed to the back-up wall by any of several methods. One method is to insert the flashing into a horizontal joint of a masonry block wall. Another method is to insert the flashing into a reglet, which is a horizontal slot placed in a poured concrete back-up wall. Yet another method is to mechanically fasten the flashing to the backup wall with screws and a termination bar. A termination bar is a strip of metal or plastic with evenly spaced holes for screws designed to spread the load evenly across the width of the bar. This may be used on any kind of back-up wall.

The flashing runs down the face of the back-up wall to a horizontal ledge or shelf. Then it turns and runs horizontally out and through the brick veneer, forming a continuous sheet that guides any water out of the wall and prevents any water from reaching the interior of the building. This flashing was traditionally made of heavy gauge copper or lead sheet that required trained metal workers to install correctly. Laps and seams needed to be soldered, which is difficult to do properly and in a watertight fashion.

One solution to this problem is disclosed in U.S. Pat. No. 2,005,221, which is not admitted to being prior art by its inclusion in this Background section. In that patent, a copper flashing is provided with a waterproofed fabric adhered to it. However, it cannot wick water away because it is waterproof by definition.

Another problem that appears in through-wall flashing and cavity wall construction is that, as the wall is built, excess mortar from subsequent layers of brick falls into the cavity and blocks the weep openings or ropes, which can render these very important components of this system inoperable. One solution to this problem was disclosed in U.S. Pat. No. 6,023,892, which is not admitted to being prior art by its inclusion in this Background section. The solution is to place something such as pea-stone gravel or plastic mesh in the cavity to allow water to migrate through the gravel or plastic mesh to the weeps, yet prevent mortar and debris from clogging these openings. Other solutions are still in use today, like using pea-stone gravel or a plastic mesh unit.

Both gravel and plastic mesh cavity filling devices have deficiencies. Gravel is heavy and difficult to transfer to higher levels of scaffolding, which leads to it being omitted. There are also claims that, because of its density in the cavity, it allows the mortar to fill up the cavity, thereby defeating the purpose. Plastic mesh products, commonly marketed under the MORTAR NET and MORTAR BREAK trademarks, are quite expensive, often costing more than the flashing itself.

For devices like drip edges, termination bars, and flashings for use with masonry, the two metals commonly used for these devices are stainless steel and copper. Both copper and stainless steel are noble metals that live well with both water and with the alkalinity of the mortar. Copper and stainless steel will not easily corrode like aluminum or steel. Longevity of these products is also important, since most brick walls are expected to last at least 100 years.

This has led to the need for a product that eliminates the need for other products, is easy to install, and performs as well or better than other products which, when combined, serve the purpose of diverting water from a masonry wall cavity.

SUMMARY OF THE INVENTION

In 1960, the price of copper was about $1,000 per metric ton. From 1960 to about 2005, the price of copper increased gradually, but generally remained at or below $2,500 per metric ton. Thus, there was no need to explore using the much more expensive stainless steel sheet for through-wall masonry flashing. From 2005 to the present, however, the price of copper has increased sharply with the price approaching $9,000 per metric ton in 2011 and 2012.

Due to the physical properties of copper, as it is rolled or worked into a thinner sheet, it becomes more susceptible to damage. In contrast, stainless steel sheet materials generally begin as thin sheets and the thickness is increased by adding more material. In doing so, the stainless steel sheet becomes thicker and harder as it is worked. Copper flashing devices that have a thinner copper sheet therefore suffer from decreased wear resistance and reduced damage protection to the building. The performance of copper flashing products can be improved by laminating a reinforcing fabric to thin copper sheet membranes, but copper's softness often requires that reinforcing fabric be adhered to both sides of the copper membrane to achieve the desired longevity and durability. Reinforcing fabric often interferes with the ability to adhere air barriers and sealants to the flashing. Thus, it is desirable to have a flashing membrane that is reinforced on only one side so that a clean metal substrate is available for adhering barriers, sealants, and the like.

Additionally, the National Fire Protection Association's 2012 fire combustion code 285 (NFPA 285-2012) was amended to include all water-resistant barriers. NFPA 285-2012, incorporated herein by reference in its entirety, requires that water resistant barriers like flashing devices be non-combustible when used in buildings that are four or more stories tall. Unlike petroleum-based products, stainless steel sheet conforms to NFPA 285-2012.

Until about the mid-2000s, the use of air barriers and spray polyurethane foam insulation products were not common nor were they required by building codes. The exothermic reaction between chemicals that are mixed while spraying polyurethane spray foam generates enough heat to degrade or melt through most polymer-based through-wall flashings and enough heat to degrade the reinforcing face of copper fabric flashing. Stainless steel sheet, however, can handle the heat generated while spraying polyurethane spray foam.

Stainless steel sheet provides excellent puncture resistance, durability, and longevity, but heretofore has been much more expensive than copper. Stainless steel sheet has a puncture resistance between 2000 and 3000 psi compared to 400 psi puncture resistance of copper sheet of comparable thickness (e.g., 2 ounces per square foot copper sheet). Absent a reinforcing material, stainless steel sheet flashing with a thickness of about 2 mils (i.e., 0.002 inch) is unruly to work with, therefore making it a flashing that cannot be installed properly. A reinforcing fabric adhered to this stainless steel sheet overcomes this problem. As an added benefit, masonry flashing products having a stainless steel membrane with a thickness of approximately 0.002 inch can be shipped as a roll and formed on the jobsite rather than needing to be formed at a sheet metal shop and shipped in its finish shape to the jobsite. This contrasts traditional stainless steel flashing with a thickness of about 0.0154 inch, which is too heavy to be shaped on the jobsite without additional machinery.

Because of the problems of increased copper prices, revised fire protection codes requiring non-combustible materials, the desire for flashing membranes that may be formed on the jobsite, and the desire for flashing products that have longevity superior of that of synthetic through-wall flashing products (e.g., rubberized asphalt, EPDM, and PVC) a need exists for thinner and/or alternate materials for through-wall masonry flashing membranes.

The present invention achieves these and other objectives by providing a through-wall flashing and drainage device having a stainless steel flashing membrane and at least one reinforcing cloth affixed to a first side of the flashing membrane. In one embodiment of the present invention, a through-wall masonry flashing and drainage device has a flashing membrane made of stainless steel sheet with a thickness between about 0.001 inch and about 0.007 inch. At least one reinforcing cloth is affixed to a first side of the flashing membrane where, when installed between an inner wall and outer wall, water between the inner wall and outer wall is drained to the outside of the outer wall by the through-wall masonry flashing drainage device.

In one embodiment of the present invention, the stainless steel sheet is between about 0.0015 and about 0.003 inch. In another embodiment of the present invention, the stainless steel sheet has a thickness of about 0.002 inch.

In some embodiments of the present invention, the stainless steel sheet is type 302, type 304, or type 316 stainless steel.

In another embodiment of the present invention, the reinforcing cloth is a synthetic material. The reinforcing cloth may be polyethylene, polypropylene, paper, fiberglass, or plastic. The reinforcing cloth may be woven, solid, or a mesh.

In another embodiment of the present invention, the reinforcing cloth has a thickness between about 0.001 inch and about 0.2 inch.

In another embodiment of the present invention, the through-wall masonry flashing and drainage device has an adhesive disposed between the at least one reinforcing cloth and the flashing membrane. In some embodiments, the adhesive is acrylic adhesive, latex adhesive, hot melt adhesive, or reactive hot melt adhesive.

In another embodiment of the present invention, the reinforcing cloth is affixed to the flashing membrane by heat welding.

DETAILED DESCRIPTION

Figure 1:
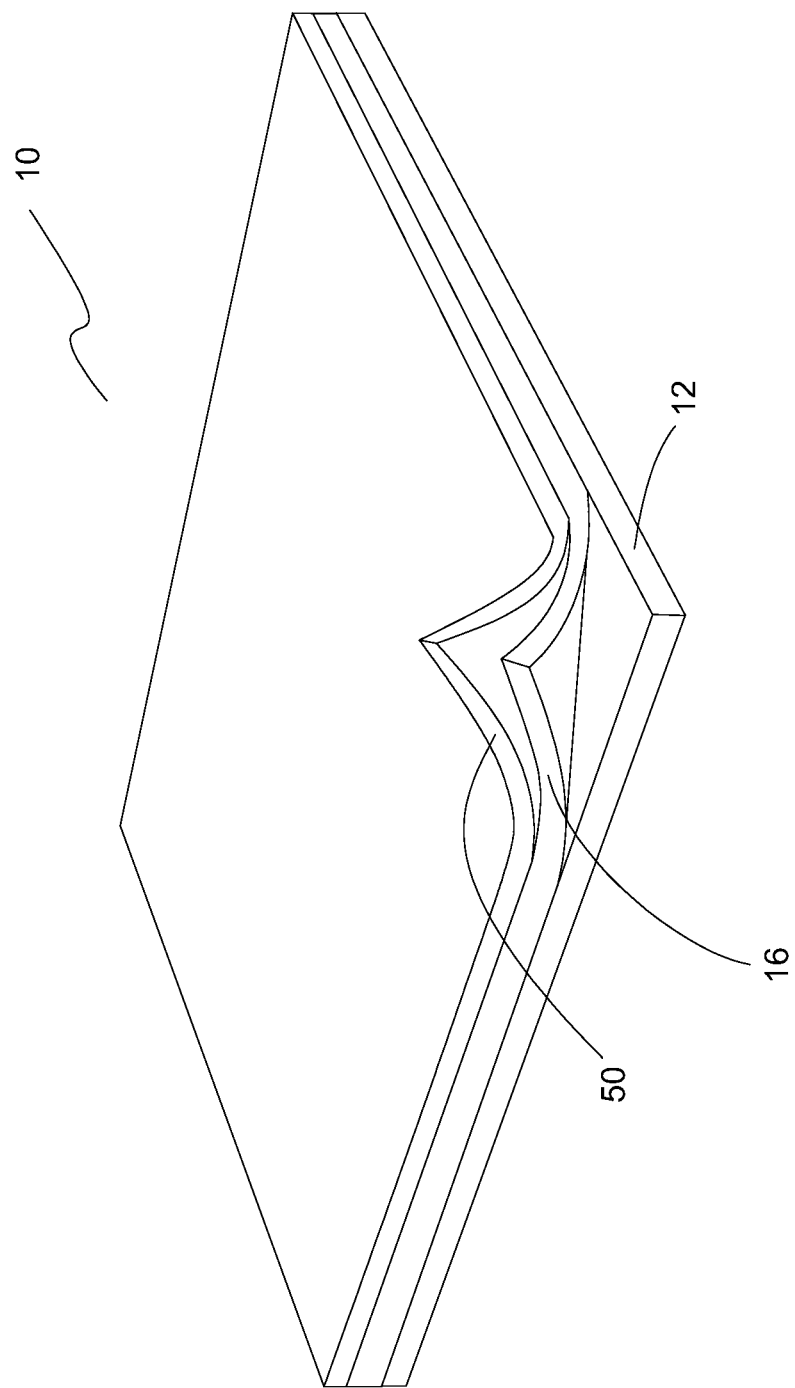
FIG. 1 illustrates a perspective view that shows the components of one embodiment of a combination flashing and drainage device of the present invention.

FIG. 1 shows one embodiment of a combination through-wall masonry flashing and drainage device 10 that includes a flashing membrane 12 and a wicking cloth 50 affixed to the flashing membrane 12. An optional adhesive 16 is disposed between flashing membrane 12 and wicking cloth 50. For clarity in showing the components of combination flashing and drainage device 10, the corners of adhesive 16 and wicking cloth 50 are shown curled up from flashing membrane 12. Wicking cloth 50 is preferably the top layer of device 10 shown in FIG. 1.

Figure 2:
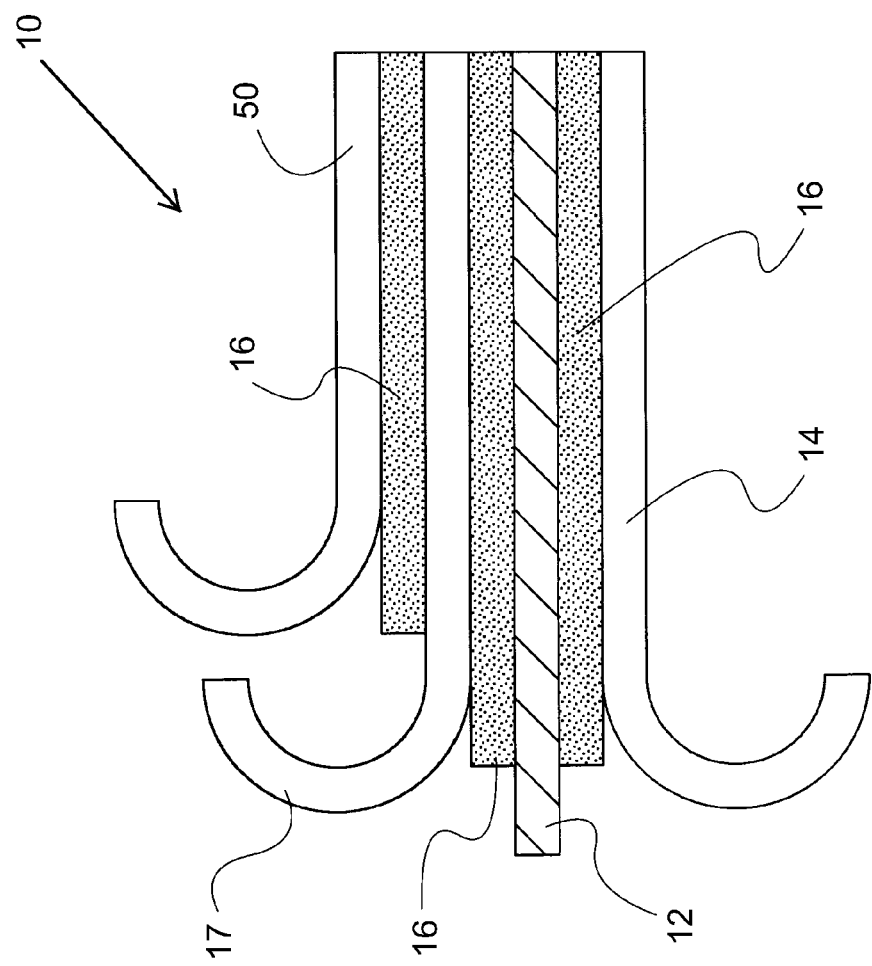
FIG. 2 illustrates a cross-sectional view that shows the components of another embodiment of a flashing and drainage device of the present invention.

FIG. 2 shows an alternate embodiment of a combination through-wall masonry flashing and drainage device 10 that includes a flashing membrane 12, a first reinforcing cloth 14 affixed to a first side of flashing membrane 12 with an adhesive 16. A second reinforcing cloth 17 is affixed to a second side of flashing membrane 12 with adhesive 16. A wicking cloth 50 is affixed to second reinforcing cloth 17 with adhesive 16. For the purpose of clarity in showing the components of combination flashing and drainage device 10, reinforcing cloths 14, 17 and wicking cloth 50 are shown in FIG. 1 as curling away from flashing membrane 12. Flashing membrane 12 is preferably at the core of device 10 shown in FIGS. 2 and 3.

Figure 3:
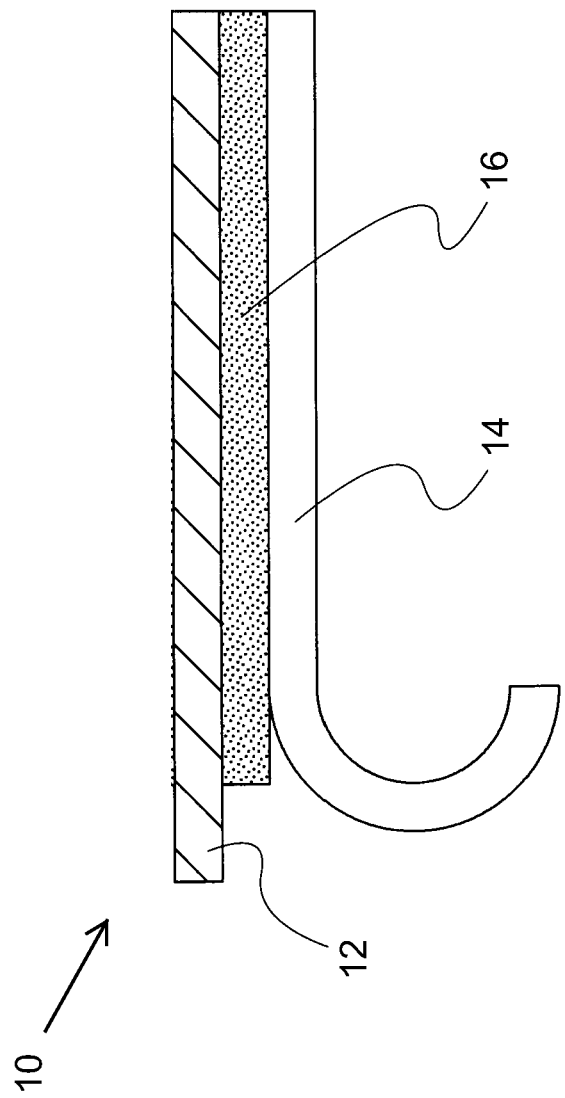
FIG. 3 illustrates a cross-sectional view that shows the components of another embodiment of a flashing and drainage device of the present invention

FIG. 3 shows a further embodiment of through-wall masonry flashing and drainage device 10 that includes flashing membrane 12, reinforcing cloth 14, and optional adhesive 16.

Examples of suitable flashing membrane materials include, without limitation, metal, polymers, paper, and bituminous materials. Metal materials for flashing membrane 12 include copper, stainless steel, galvanized steel, aluminum, zinc, alloys of these metals, and other metals. If copper is used for the flashing membrane, the copper preferably conforms to ASTM B-370-98 (incorporated herein by reference), weighs 2 to 24 ounces/square foot, and is between 0.0036 inches and 0.0094 inches thick.

In one embodiment, flashing membrane 12 is stainless steel sheet having a thickness of between 0.001 inch and 0.007 inch, preferably between 0.0015 inch and about 0.003 inch, and more preferably about 0.002 inch. Stainless steel sheet may be type 302, type 304, or type 316, with preference for type 304 stainless steel. In this embodiment, at least one reinforcing cloth 14 is affixed to a first side of flashing membrane 12. Preferably, a second side of flashing membrane 12 does not have second reinforcing cloth 17 adhered to it, leaving a bare metal surface for adhering barriers, sealants, and the like. In one embodiment, reinforcing cloth 14 is woven polyethylene sheet with a thickness between about 0.001 inch and about 0.20 inch. Other acceptable reinforcing cloth 14 materials include, for example, polypropylene, paper, fiberglass, and plastic sheet. Reinforcing cloth 14 may be woven, solid, or perforated (e.g., a mesh).

Reinforcing cloth 14 is preferably adhered with a hot-melt-type adhesive, such as rubber or latex. Other acceptable methods for adhering reinforcing cloth 14 to stainless steel flashing membrane 12 include, for example, melting a polymer-based reinforcing cloth 14 to flashing membrane 12 or coating flashing membrane 12 with acrylic adhesive 16 and applying reinforcing cloth 14 to the coating of acrylic adhesive 16. In one embodiment, reinforcing cloth 14 has a self-adhesive layer or coating.

Embodiments of through-wall masonry flashing and drainage device 10 that have a stainless steel flashing membrane 12 and reinforcing fabric 14 on one side of flashing membrane 12 have several advantages over flashing products. Stainless steel used for the flashing membrane has a cost similar to that of copper sheet that is 2 ounces per square foot. Device 10 with stainless steel flashing membrane 12 has superior puncture resistance to copper sheet, and therefore only requires reinforcing cloth 14 on one side of flashing membrane 12. Because of its superior puncture resistance, stainless steel is more wear-resistant and better prevents wear and damage to device 10 on the jobsite. Stainless steel also has the longevity of copper and will last as long as the masonry wall itself, unlike rubberized asphalt products. Device 10 also can be used with the bare stainless steel flashing membrane 12 as the outside or top surface to provide a substrate to which sealants and air barriers may be adhered. Also, device 10 with stainless steel flashing membrane 12 conforms to 2012 National Fire Protection Association code 285 as a non-combustible material. Further, embodiments of through-wall masonry flashing and drainage device 10 with stainless steel flashing membrane 12 can be shipped in roll form to a jobsite and formed by workers on-site.

Flashing membrane 12 in some embodiments is chosen from a group of polymer-based membranes that includes a variety of plastic, rubber, resins, and the like. In one embodiment, flashing membrane 12 is made of spunbond polypropylene, a non-woven fabric made of thermally-bonded, continuous polypropylene filaments. In another embodiment, flashing membrane 12 is a polyolefin membrane. One example of polyolefin membranes is a peel-and-stick polyolefin substrate known as the GenFlex-TPO Peel & Stick® curb flashing. GenFlex-TPO is a thermoplastic polyolefin membrane with a thickness of about 0.040-0.060" and reinforced with polyester or fiberglass scrim. The product is made according to ASTM D 6878-03, incorporated herein by reference. Polyolefin membrane materials also include non-woven spunbond polyolefin fiber membranes, such as DuPont's Tyvek® non-woven HomeWrap®. Other suitable membrane materials include polyvinyl chloride (PVC), ketone ethylene ester resin (e.g., DuPont's Elvaloy® KEE), polystyrene (e.g., Dow Styrofoam™), polyisocyanurate and glass-fiber reinforced polysiocyanurate (e.g., Dow Thermax® insulation board), polyethylene, woven polypropylene, spunbond polypropylene, and ethylene propylene diene monomer rubber (EPDM) (e.g., Firestone FlashGard™ Thru-Wall flashing).

Flashing membrane 12 may also be made of paper-based materials. Examples of paper membranes include kraft paper, red rosin paper, natural rosin paper, or fiberglass-reinforced multi-ply kraft paper, such as Seekure® by Fortifiber Corp.

Bituminous membrane materials include asphalt-impregnated paper, asphalt saturated kraft paper, tar paper shingle underlayment, and polymer-modified bituminous materials. The #15 and #30 multi-purpose felt made by American Saturated Felt, Inc. are examples of suitable bituminous flashing membranes.

Polymer-modified bituminous sheet materials include those where styrene butadiene styrene (SBS) thermoplastic elastomer is the primary modifier. The polymer-modified bituminous sheet may be granule surfaced sheet or a smooth-surfaced prefabricated bituminous sheet. The sheet is preferably reinforced with polyester fabric modified by styrene butadiene styrene (SBS) thermoplastic elastomer. Specifications for these materials are described in ASTM D 6164-00 and D 6164-11, both of which are incorporated herein by reference.

In embodiments where flashing membrane 12 is a copper fabric flashing, an optional first reinforcing cloth 14 is affixed to a first side of the flashing membrane 12 using an adhesive 16. The reinforcing cloth 14 is preferably made of fiberglass and can be woven or non-woven, but preferably weighs between 0.2 and 0.3 ounces/square foot (about 1.5-3 ounces per square yard). Other natural or synthetic fabrics could also be used instead of fiberglass. Adhesive 16 is preferably a hot-melt type of adhesive, and is either rubber or latex.

In embodiments where flashing membrane 12 is made of copper or other metal fabric flashing, an optional second reinforcing cloth 17 may be provided and affixed to a second side of the flashing membrane 12 with a layer of adhesive 16. Second reinforcing cloth 17 may be the same material as first reinforcing cloth 14. The purpose of first reinforcing cloth 14 and second reinforcing cloth 17 is to reinforce and protect the flashing membrane during installation, and also to provide a rough textured surface that promotes bonding in the mortar joint.

A wicking cloth 50 is provided and affixed to the second side of the flashing membrane 12 with an adhesive 16. In the embodiment shown in FIG. 1, wicking cloth 50 is affixed to the top surface of flashing membrane 12. If a second reinforcing cloth 17 is used, then the wicking cloth 50 is affixed to the outside of the second reinforcing cloth 17 as shown in FIG. 2. Otherwise, the wicking cloth 50 is affixed directly to the flashing membrane 12 with a layer of adhesive 16. The wicking cloth 50 is preferably made of polyester, polypropylene, polypropylene nylon, or polyethylene. The material is preferably 0.050 inches thick, and weighs between five and seven ounces/square yard. The wicking cloth 50 can be either woven or non-woven. A synthetic fiber material is preferred for long life, mildew resistance, and strength. The primary criterion is that the cloth has suitable wicking characteristics to remove water from wall cavity 44 by capillary action. This is unlike fibers, such as cotton, which absorb and retain water.

Unlike the present invention, materials and devices used previously do not have wicking material that runs the length of the front joint of an outside wall. The previous materials and devices relied only on gravity to transport water from between an inside and outside wall through weep vents in the outside wall. The present invention uses wicking in addition to gravity to transport water through the mortar joint without a weep vent. To emphasize the technical difference between the two liquid transport methods, wicking is the absorption of liquid into a material by capillary action. Wicking is also known as fiber tow infiltration.

Adhesive layer 16 is preferably an acrylic adhesive, a latex adhesive, a non-reactive hot melt adhesive, or a reactive hot melt adhesive. In one method of making embodiments of through-wall masonry flashing and drainage device 10, a reactive hot melt adhesive 16 is applied in its molten form to flashing membrane 12. Wicking cloth 50 or reinforcing cloth 14 is then pressed into adhesive 16. As adhesive 16 cools an/or reacts with air or water, it cures and affixes wicking cloth 50 or reinforcing cloth 14 to flashing membrane 12.

Other methods of lamination may also be used to affix wicking cloth 50 or reinforcing cloth 14 to flashing membrane 12. For example, wicking cloth 50 or reinforcing cloth 14 and/or flashing membrane 12 are heated to a semi-molten state and pressed into one another in a heat welding process. In another embodiment, multiple layers of fabrics are needled together. In needling, a barbed needle passes through the first fabric, catching the fibers of the first fabric and dragging them through to the second fabric where the fibers become entangled with fibers of the second fabric to attach the first fabric to the second fabric. Needling thus may be used to secure multiple fabrics together or to secure a fibrous wicking cloth 50 or reinforcing cloth 14 to flashing membrane 12.

Embodiments having first reinforcing cloth 14 and second reinforcing cloth 17 are preferably manufactured as a continuous web on a double-sided, extrusion slot-die, coater/laminator. The flashing membrane base material 12 is fed into the machine where it passes over the first of two slot die extruders. The adhesive 16 is extruded in a continuous sheet or film and applied through contact to one side of flashing membrane 12. First reinforcing cloth 14 is immediately introduced and pressed into adhesive 16 by a series of rollers to create a three-layer product. Similarly, wicking cloth 50 may be pressed into adhesive 16. To apply a second reinforcing cloth 17 or wicking cloth 50, the three-layer product continues through the machine to such a point where the opposite side passes over the second slot die. Adhesive 16 is extruded and the second wicking cloth 50 or second reinforcing cloth 17 is applied in the same manner as the first, but to the opposite side of flashing membrane 12. If a third layer is to be applied, where device 10 has two layers of reinforcing cloth 14, 17 and one layer of wicking cloth 50, the product would be passed through the machine a second time. For embodiments that include reinforcing cloth 14 on only one side of flashing membrane 12, reinforcing cloth 14 can be adhered to flashing membrane 12 by similarly using a single-sided extrusion die coater/laminator.

As an alternative, through-wall flashing and drainage device 10 could also be made as a self-adhesive product, combining a self-adhesive roofing underlayment-style membrane with the wicking fabric 50 or reinforcing cloth 14 on either the inner surface or outer surface. This roofing underlayment would be best described in ASTM standards D 6164-00 and D 1970-01 with the "top surface" being the wicking fabric. ASTM D6164-00 and D1970-01 are incorporated herein by reference.

Figure 4:
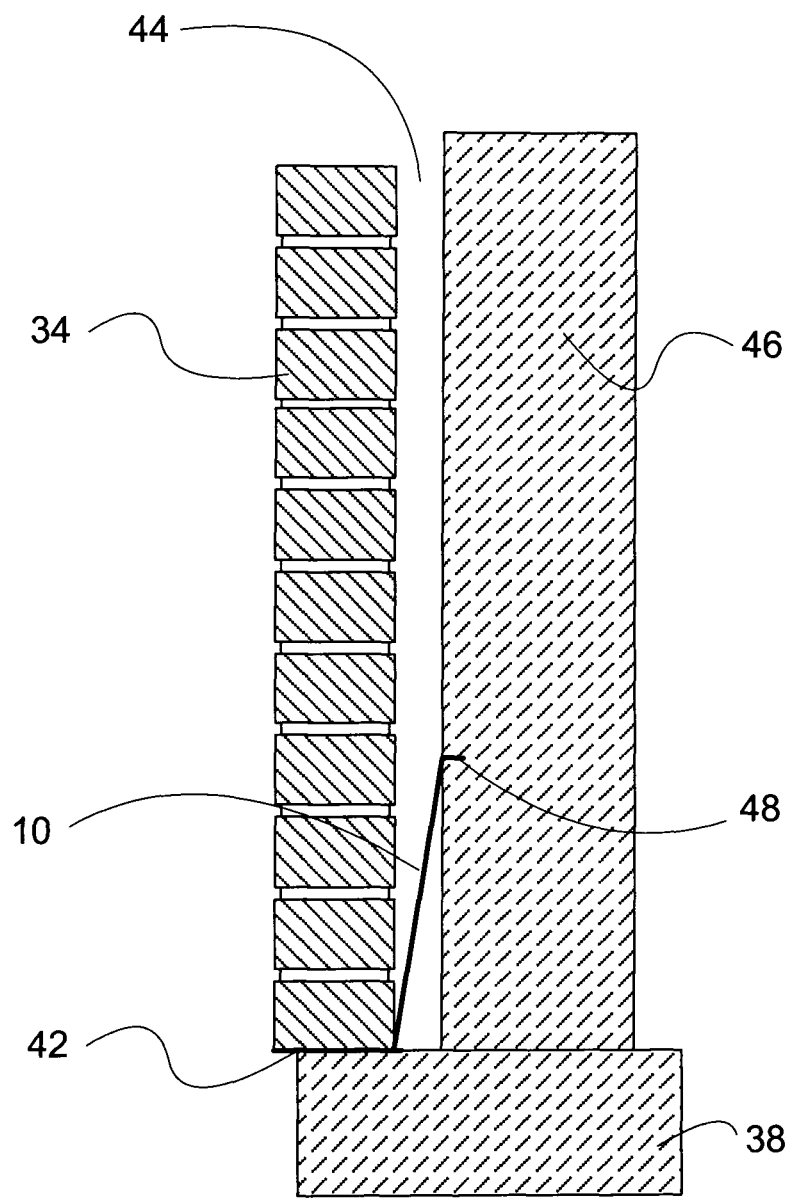
FIG. 4 is a side cut-away view of a masonry wall showing how devices of the present invention can be used.

FIG. 4 shows an example of how device 10 can be used. A two-inch cavity structure 44 has an upstanding front brick wall 34 and a back concrete wall 46 supported on a horizontal concrete support 38, wherein about a two inch cavity is between the front and back walls. The through-wall masonry flashing and drainage device 10 is shown as secured in a reglet 48 of the back concrete wall 46 bonded mechanically within the reglet 48. The flashing material extends downwardly within the two inch cavity 44 and exits at the front mortar joint 42, permitting trapped water to be released to the outside of the structure without the need for vents. Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The claimed invention is:

1. A through-wall masonry flashing and drainage device consisting of:
   a flashing membrane made of stainless steel sheet, the flashing membrane having a thickness between 0.001 and 0.007 inch;
   a reinforcing cloth affixed to a first side of the flashing membrane and forming a through-wall masonry flashing and drainage device in a continuous roll form; and
   an adhesive disposed between the flashing membrane and the reinforcing cloth.

2. The device of claim 1, wherein the stainless steel sheet has a thickness between about 0.0015 inch and about 0.003 inch.

3. The device of claim 1, wherein the stainless steel sheet has a thickness of about 0.002 inch.

4. The device of claim 1, wherein the stainless steel sheet is selected from the group consisting of type 302, type 304, and type 316 stainless steel.

5. The device of claim 1, wherein the reinforcing cloth is a synthetic material.

6. The device of claim 1, wherein the reinforcing cloth is selected from the group consisting of polyethylene, polypropylene, paper, fiberglass, and plastic.

7. The device of claim 1, wherein the reinforcing cloth is woven.

8. The device of claim 1, wherein the reinforcing cloth is a mesh.

9. The device of claim 1, wherein the reinforcing cloth has a thickness of about 0.001 inch to about 0.20 inch.

10. The device of claim 1, wherein the adhesive is selected from the group consisting of an acrylic adhesive and a latex adhesive.

11. The device of claim 10, wherein the adhesive is selected from the group consisting of a hot-melt adhesive and a reactive hot-melt adhesive.

12. The device of claim 1, wherein the reinforcing cloth is capable of absorbing moisture and wherein capillary action of the reinforcing cloth transmits water from a cavity defined between an inner wall and an outer wall of a structure to a location outside the structure.

* * * * *